(12) United States Patent
Emmett et al.

(10) Patent No.: US 10,985,980 B2
(45) Date of Patent: Apr. 20, 2021

(54) DETECTING CLONED MEMBERS OF AN ENTERPRISE MESSAGING ENVIRONMENT

(71) Applicant: International Business Machines Corporation, Armonk, NY (US)

(72) Inventors: Andrew Anthony Emmett, Eastleigh (GB); Sean John Cawood, Eastleigh (GB); Richard Bartholomew Prescott, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 16/385,323

(22) Filed: Apr. 16, 2019

(65) Prior Publication Data
US 2020/0336372 A1 Oct. 22, 2020

(51) Int. Cl.
*H04L 12/24* (2006.01)
*G06Q 10/10* (2012.01)

(52) U.S. Cl.
CPC ....... *H04L 41/0813* (2013.01); *G06Q 10/107* (2013.01); *H04L 41/0668* (2013.01); *G06F 2201/805* (2013.01)

(58) Field of Classification Search
CPC ............ H04L 41/0813; H04L 41/0668; G06Q 10/107; G06F 2201/805; G06F 2009/45562; G06F 16/273
USPC ....................................................... 709/221
See application file for complete search history.

(56) References Cited

U.S. PATENT DOCUMENTS

| 9,059,898 B2 | 6/2015 | Mallya et al. | |
|---|---|---|---|
| 2011/0022694 A1* | 1/2011 | Dalal | H04L 41/0856 709/222 |
| 2011/0035474 A1* | 2/2011 | Elzur | H04L 41/0823 709/221 |
| 2013/0311441 A1* | 11/2013 | Erdogan | G06F 16/245 707/713 |

(Continued)

OTHER PUBLICATIONS

Yadav et al., "Prevention of DR Configuration Drifts in geographically separated application clusters", An IP.com Prior Art Database Technical Disclosure, ip.com No. IPCOM000246681D, Electronic Publication Date: Jun. 27, 2016, 7 pages, <https://priorart.ip.com/IPCOM/000246681>.

(Continued)

*Primary Examiner* — Tan Doan
(74) *Attorney, Agent, or Firm* — Edward J. Wixted, III

(57) ABSTRACT

A production messaging node in a messaging environment registers a subscription to itself (registers a self-subscription) with a central repository. The self-subscription enables the production messaging node to detect and identify a clone of itself in the messaging environment. The self-subscription ensures that a configuration change applied to the clone triggers a notification that is sent to the production messaging node. The notification enables the production messaging node to determine that the clone is active in the messaging environment. The production messaging node may then respond in various ways depending on the prevailing circumstances. Self-subscribing a messaging node to a central repository enables detection and identification of a cloned messaging node which if left un-marshalled, may disrupt the functioning of the messaging configuration.

15 Claims, 5 Drawing Sheets

(56) References Cited

U.S. PATENT DOCUMENTS

| | | | |
|---|---|---|---|
| 2013/0329605 A1* | 12/2013 | Nakil | H04L 41/0659 370/255 |
| 2015/0169417 A1* | 6/2015 | Brandwine | G06F 11/2007 714/4.11 |
| 2016/0070494 A1 | 3/2016 | Barnes et al. | |
| 2016/0094625 A1 | 3/2016 | Sengodan et al. | |

OTHER PUBLICATIONS

"A method to detect harmful replication and migration configuration in content management systems" An IP.com Prior Art Database Technical Disclosure, Disclosed Anonymously, ip.com No. IPCOM000233209D, Electronic Publishing Date: Dec. 2, 2013, 5 pages, <https://priorart.ip.com/IPCOM/000233209>.

* cited by examiner

DETECTING CLONED MEMBERS OF AN ENTERPRISE MESSAGING ENVIRONMENT

BACKGROUND

The present invention relates generally to the field of asynchronous messaging, and more particularly to detecting when a production node in the messaging system has been cloned and the clone is functioning in parallel with the production node.

Within an enterprise messaging system, messaging nodes generally have both a name and a unique identifier to differentiate them from one another. The name would primarily be used when referring to the specific messaging node.

When the nodes are part of a semi-autonomous system (or cluster), a combination of the name, unique identifier and other data, is used to distinguish the nodes. This enables the cluster automatically to provide and manage its own disaster recovery (DR) configuration options. Particularly in the event of a problem or disaster involving a production node, a new node can be created with the same name as the production node which the new node is replacing. The new node has an identifier that is unique from all other identifiers in the system including the original 'instance' (the production node).

These mechanisms enable multiple enterprise messaging systems to coexist. For example, in a multiple enterprise messaging system, a production environment can coexist with a standby system that is configured for disaster recover and used as a testing environment. The production and standby systems can each all have the same node names within their independent configurations.

SUMMARY

According to an aspect of the present invention, there is a method, computer program product and/or system that performs the following operations (not necessarily in the following order): (i) registering, by a first node of a computing environment, a self-subscription, with a central repository of the computing environment; (ii) receiving, by the first node, a notification message including information with respect to a configuration modification of a second node; (iii) in response to receiving the notification message, determining that a clone of the first node is active in the computing environment; and performing a responsive action with respect to the clone. The second node is configured to operate as a clone of the first node. The notification message is generated based on a combination of the configuration modification and the self-subscription.

According to a further aspect of the present invention, there is a method, computer program product and/or system that performs the following operations (not necessarily in the following order): (i) reconfiguring the first node to assume an inactive state with respect to the computing environment; (ii) reconfiguring the second node to assume an inactive state with respect to the computing environment; (iii) reconfiguring the second node such that the second node ceases to operate as a clone of the first node in the computing environment; and/or (iv) reconfiguring both the first node and the second node whereby both the first node and the second node operate in conjunction with one another, in a workload sharing fashion, in the computing environment.

DETAILED DESCRIPTION

Figure 1:
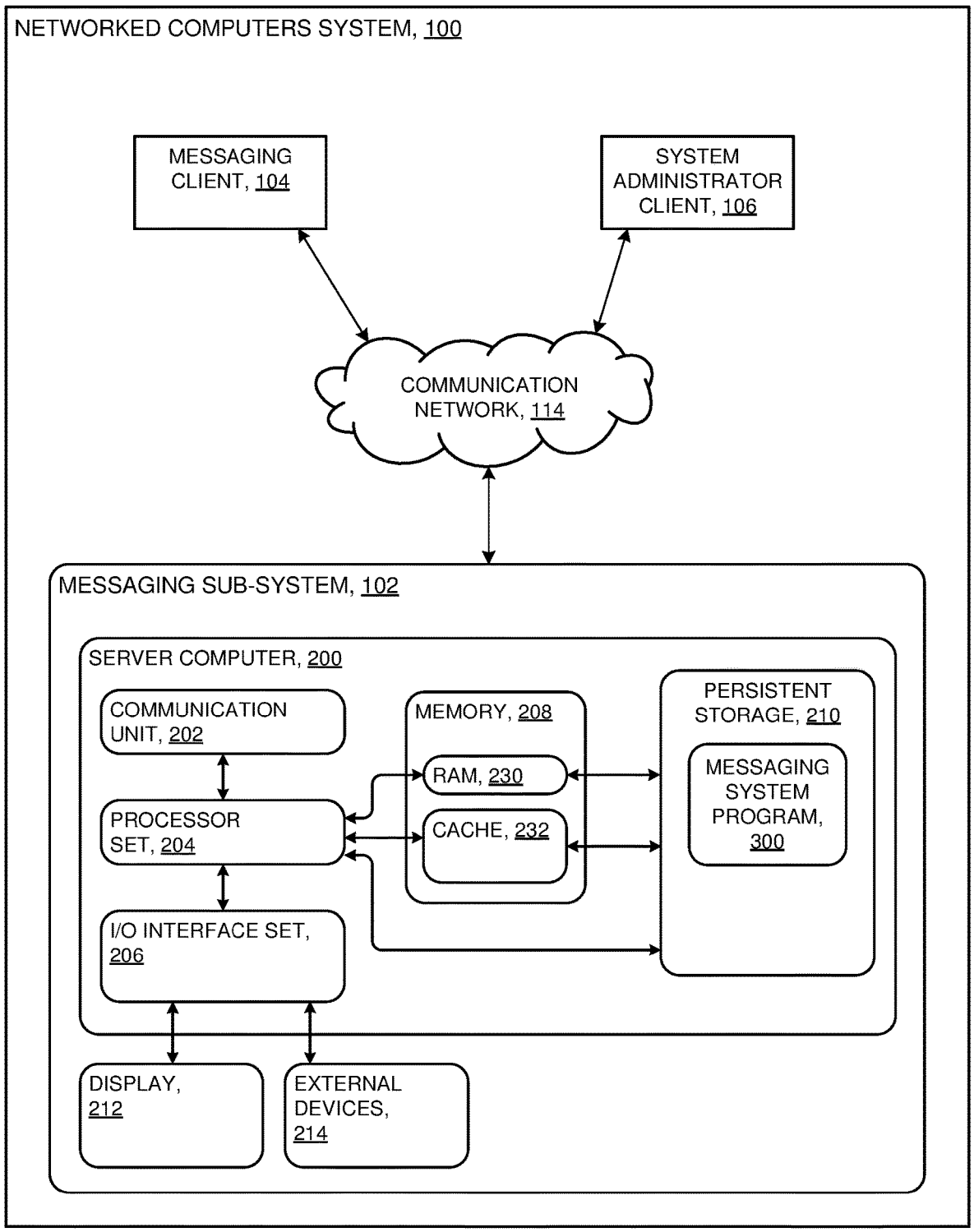
FIG. 1 is a block diagram of a first embodiment of a system according to the present invention.

In a messaging environment such as an enterprise scale messaging computing environment, a messaging node registers a self-subscription with a central repository. Any configuration change with respect to the messaging node, because of the self-subscription, causes a notification to be sent to the messaging node. If a clone of the messaging node is re-configured to appear in the messaging environment, the re-configuration triggers a notification to be sent to the messaging node. In response, messaging node can determine that the clone is present in the environment, and can take appropriate action, such as expelling the clone from the environment, working in tandem with the clone in a load-sharing arrangement, relinquishing its own place in the messaging environment, etc., depending on the prevailing circumstances.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: messaging sub-system 102; messaging client 104; system administrator client 106, communication network 114; server computer 200; communications unit 202; processor set 204; input/output (I/O) interface set 206; memory device 208; persistent storage device 210; display device 212; external device set 214; random access memory (RAM) devices 230; cache memory device 232; and messaging system program 300.

Messaging sub-system 102 is, in many respects, representative of the various computer sub-system(s) in embodiments of the present invention. Accordingly, several portions of messaging sub-system 102 will now be discussed in the following paragraphs.

Messaging sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Program 300 is a collection of machine readable instructions and/or data that is used to create, manage, and control certain software functions that will be discussed in detail, below, in the Example Embodiment sub-section of this Detailed Description section.

Messaging sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Messaging sub-system 102 is shown as a block diagram with many double arrows. These double arrows (no separate reference numerals) represent a communications fabric, which provides communications between various components of messaging sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for messaging sub-system 102; and/or (ii) devices external to messaging sub-system 102 may be able to provide memory for messaging sub-system 102.

Program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to messaging sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
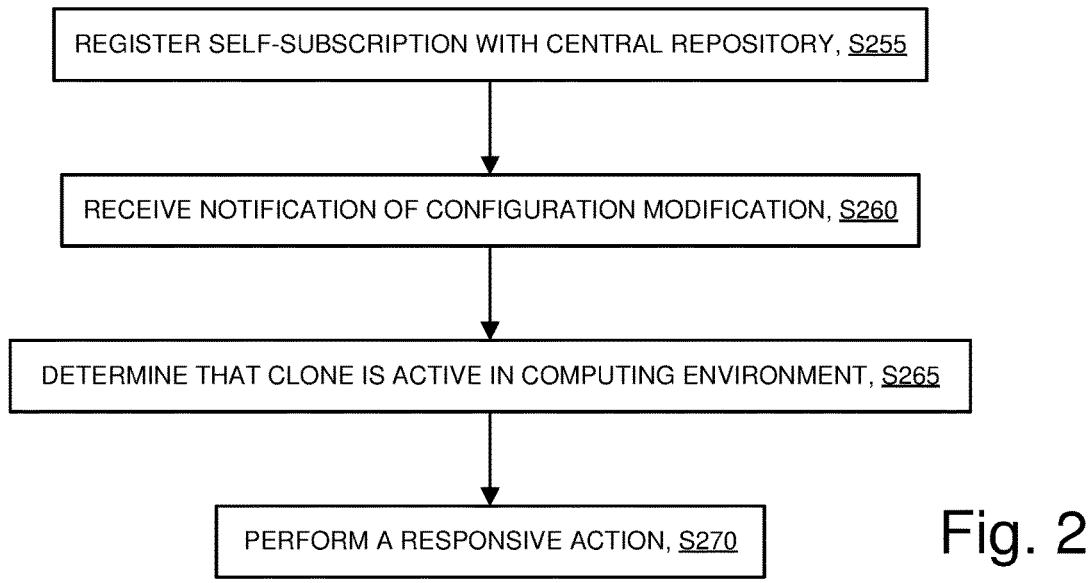
FIG. 2 is a flowchart showing a first embodiment method performed, at least in part, by the first embodiment system.
Figure 3:
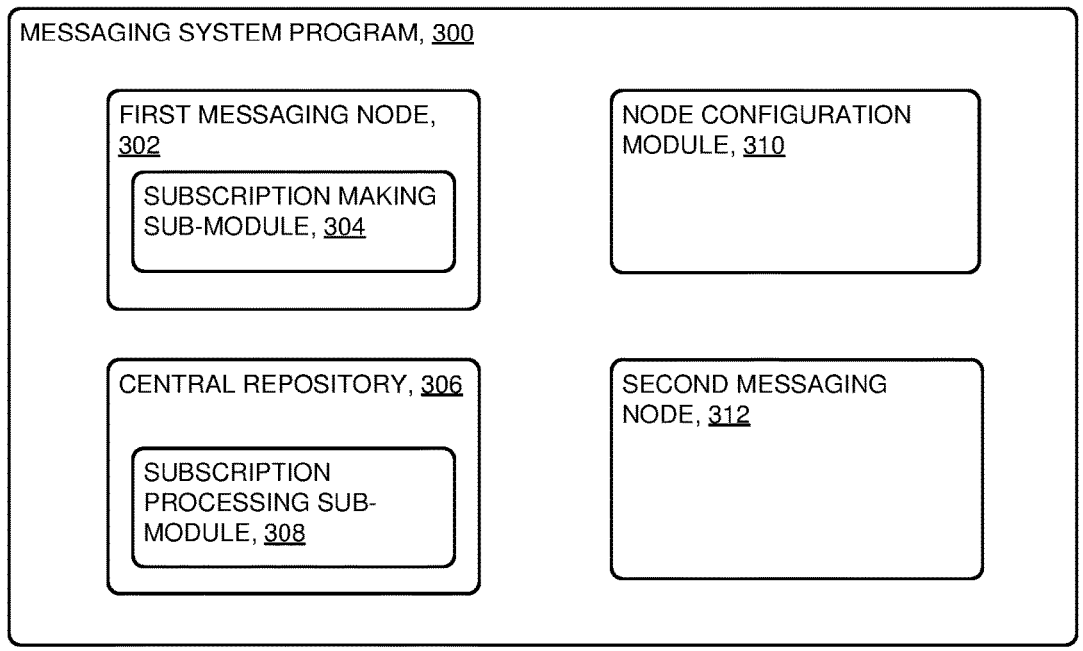
FIG. 3 is a block diagram showing a machine logic (for example, software) portion of the first embodiment system.

FIG. 2 shows flowchart 250 depicting a method according to the present invention. FIG. 3 shows messaging system program 300 for performing at least some of the method operations of flowchart 250. This method and associated software will now be discussed, over the course of the following paragraphs, with extensive reference to FIG. 2 (for the method operation blocks) and FIG. 3 (for the software blocks). Note: A messaging environment comprises at least the messaging system program 300 and components thereof.

Processing begins at operation S255, where subscription making sub-module 304, of first messaging node 302, of messaging system program 300, registers a self-subscription with subscription processing sub-module 308 of central repository 306, of messaging system program 300. The self-subscription includes information identifying first messaging node 302, such as a name and an identifier. Subscription processing sub-module 308 records the self-subscription. In other words, first messaging node 302 has signed up (by virtue of registering the self-subscription) to receive messages with respect to updates pertaining to itself (first messaging node 302).

Processing proceeds at operation S260, where subscription processing sub-module 308 receives an informational message, the content of which includes information that node configuration module 310 has made a configuration update with respect to second messaging node 312. Second messaging node 312 (as are all nodes in the messaging system) is associated with a name and an identifier (ID). Subscription processing sub-module 308 looks up a list of entities (messaging nodes, subscribed users, etc.) that have subscribed to second messaging node 312. The second node has the same name and ID as the first node, and in fact is a clone of the first node. Because (i) the self-subscription was registered by first messaging node 302 in operation S255 above, and (ii) second messaging node 312 is associated with the same name and ID as first messaging node 302, subscription processing sub-module 308 sends an informational message to all members subscribed to first messaging node 302, one member of which is first messaging node 302 (due to the self-subscription).

Processing proceeds at operation S265, where first messaging node 302 determines that the node associated with the configuration update (second messaging node 312) appears to be itself (first messaging node 302) by virtue, at least, of having the same name and ID. First messaging node 302 further determines that it did not initiate the configuration update described in the informational message and that the configuration update was not directed at first messaging node 302. Based at least in part on these determinations, first messaging node 302 concludes that second messaging node 312 is a clone (of first messaging node 302) operating in the messaging environment. The clone may pose a risk of disrupting the functioning of the messaging environment.

Processing proceeds at operation S270, where first messaging node 302 performs a responsive action based on discovery of second messaging node 312 as a clone in the messaging environment. Responsive actions, in some embodiments of the present invention, are discussed further below, in the section "Further Comments and/or Embodiments" subsection of this "Detailed Description" section, and in particular with respect to FIGS. 5 and 6.

III. Further Comments and/or Embodiments

Some embodiments of the present invention recognize the following potential problem with respect to the current state of the art. Consider a conventional disaster recovery (DR) node that resides in a test system, where the DR node has the same name as a corresponding production node in a production environment. The DR node operates in parallel with the production node which should be a sole messaging node with specific nomenclature. If the DR node is introduced into production (because, for example, data communications with the production node has failed), automated DR machine logic may cause the DR node to take over the role and functions of the production node (having the same name). In such a case, the DR node becomes active in the production environment. All other interested nodes can continue to participate (interact) with the production node (actually the DR node of the same name), and may not even be aware that they are interacting with the DR node as opposed to the production node.

With respect to the scenario described in the paragraph above, conventionally, the production environment has been 'cloned' in the form of the DR environment. Analogs of all of the nodes and associated names and unique identifiers from the production environment exist on the DR environment, having the same names and unique identifiers as respectively corresponding analogs in the production environment. If cross-environment updates had been made while both systems (production and DR) were running concurrently, subtle inconsistencies (corruption) may develop between a production node and the corresponding DR node. These inconsistencies may subsequently cause unexpected consequences including failure of the cloned production node.

Some embodiments of the present invention may include one, or more, of the following features, characteristics, and/or advantages: (i) detects configuration events published into the configuration by the cloned node; (ii) takes responsive actions to prevent corruption (configuration inconsistencies) between a production node and a corresponding test and/or DR node; (iii) configuration of a messaging environment, as a whole, is owned by multiple nodes in the environment wherein the responsibility for detecting a clone in the environment devolves to each node therein; (iv) once a node detects a potential problem (for instance, a clone or imposter node), the node intervenes automatically, managed by the subscribing "owner" (node) of the configuration, to correct the problem; (v) nodes are specifically enabled to be different from each other (at least by having unique name/ID combinations); (vi) each node maintains its own configuration which is pushed to a central location (such as a master repository) and to other nodes in the cluster; (vii) able to detect an "imposter" node that has introduced itself into the messaging environment, but with a different configuration to that of the original node, and claiming itself to be the original node; and/or (vii) each node publishes its configuration data and prevents duplicate members being present in a system. With respect to item (ii) above, possible responsive actions are discussed below in this Further Comments and/or Embodiments subsection of this Detailed Description section.

In some embodiments, the DR node is capable of taking on the identity and role of a production node, and operating in place of the production node. In other words, the DR node is capable of cloning a production node.

In some embodiments of the present invention, a messaging node "self-subscribes", meaning the messaging node subscribes, not only for information that is of interest, but for its namesake (such as clones of itself) as well. Consider an isolated clone testing environment associated with a production environment. The clone testing environment includes a clone messaging node in which a configuration change is made. The clone testing environment makes a configuration change that is intended to be confined within itself. The clone messaging node may inadvertently push the configuration change and apply it into a wrong environment (for example, into the associated production environment). The publishers (the master repositories) send information, about the clone messaging nodes configuration change, back to the messaging node. The messaging node: (i) receives the "configuration change" message, which appears to be information about itself (the messaging node); (ii) determines that it (the messaging node) did not initiate the configuration change; and (iv) responds by rolling back the configuration to a state existing before the (incorrect) configuration change had been applied.

In some embodiments of the present invention, the subscriber messaging node receiving information about itself (for example, information about its own configuration change) triggers a response, by the subscriber messaging node, aimed at determining and correcting the underlying cause. In some embodiments, correcting the underlying cause involves synchronizing configuration settings between a production messaging node (the subscriber messaging node in the present analogy) and a corresponding DR node.

Some embodiments of the present invention may include one, or more, of the following features, characteristics, and/or advantages: (i) a production messaging node subscribes to itself such that it is to be notified about changes to itself—a master repository holds the subscription; (ii) the master repository sends updates, originating from a clone of the production node, to the production node; (iii) the production node detects an anomaly (for instance, corruption in the form of an unexpected configuration change); (iv) the production node initiates action to determine the source of the corruption (the unexpected configuration change) and to correct it; and/or (v) eliminates overhead for the master repository. Further with respect to item (v) above, if the master repository were tasked with attempting to detect the anomaly, in an environment containing hundreds or thousands of nodes, the task would consume significant computing resources (clock cycles, memory, etc.). In contrast, some embodiments of the present invention, enable the affected node to detect and roll back the anomaly, consuming significantly less computing resource in doing so.

Figure 4:
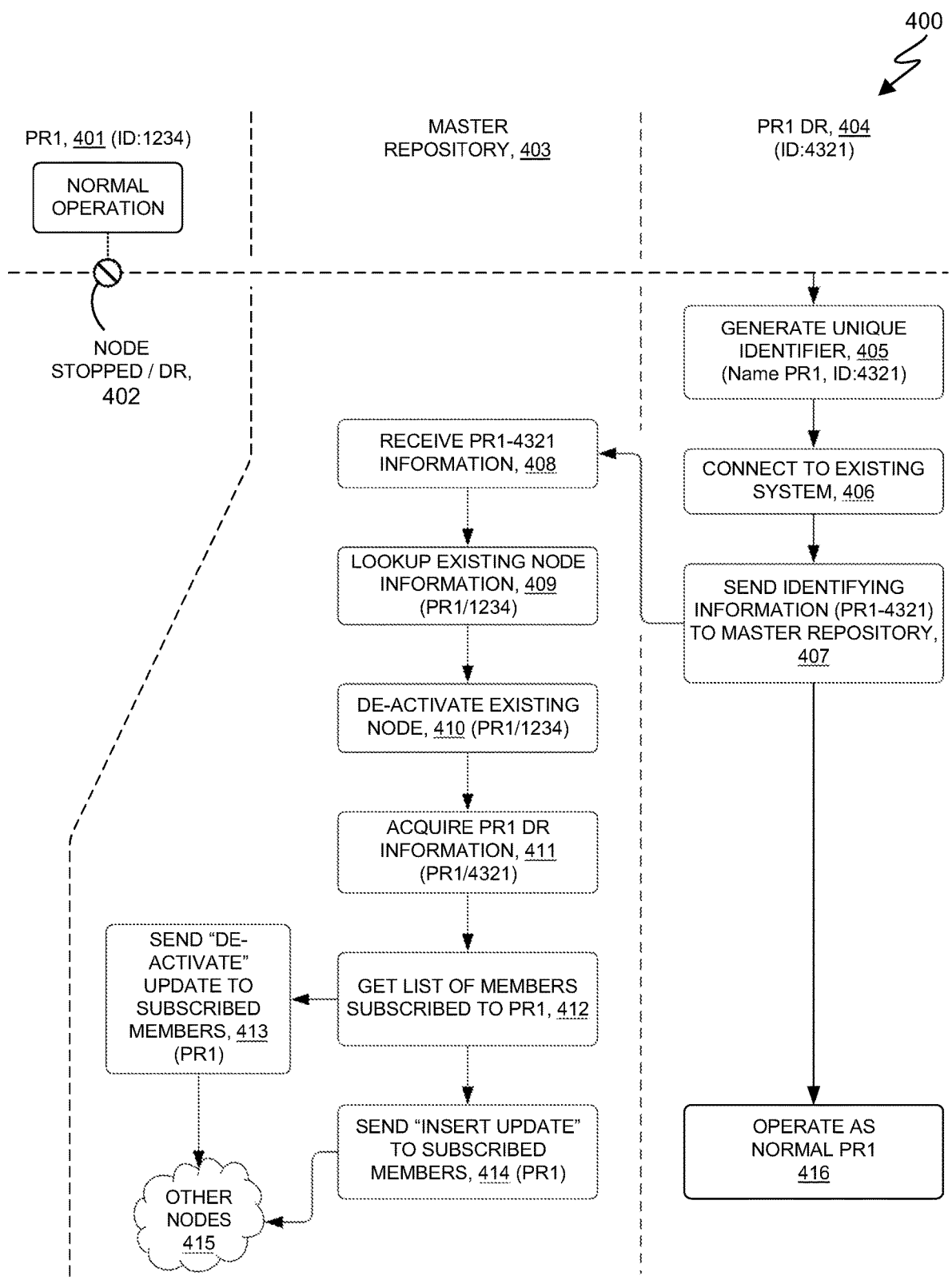
FIG. 4 is a sequence diagram showing a second embodiment method performed, at least in part, by a second embodiment system.

Sequence diagram 400 of FIG. 4 depicts an embodiment of the present invention where normal operation of a messaging node is interrupted, for example by a failure of the messaging node or by failed communications with the node. Messaging node PR1 401 (ID 1234) operates normally until a failure occurs (402). Disaster recovery node PR1 DR 404 (ID 4321) detects that PR1 401 node has stopped, and in response, goes into disaster recovery mode. PR1 DR 404 generates (405) a unique identifier. The identifier includes the name "PR1" (same name as held by PR1, 401) and an ID "4321"). PR1 DR 404 connects (406) to the existing system, and sends (407) information identifying itself to master repository 403.

Master repository 403 receives (408) the information from PR1 DR 404, and in response, performs the following operations associated with deactivating PR1 401 and substituting PR1 DR 404 in its place: looks up (409) information pertaining to PR1 401 (name "PR1", ID "1234"); de-activates (410) PR1 401; acquires (411) information pertaining to PR1 DR 404 (name "PR1", ID "4321"); and gets (412) a list of members subscribed to PR1 401.

Master repository 403, now in possession of the subscribed members list and all relevant information pertaining to PR1 DR 401, performs the following operations: sends (413) a "de-activate PR1 DR 401, ID '1234'" update to the subscribed members; sends (414) an "insert" update to the subscribed members informing them of the switch to PR1 DR 404. Subscribed members may forward (415) the information pertaining to the substitution, of PR1 DR 404 in place of PR1 401, to downstream nodes as appropriate.

Meanwhile, in further response to the failure (402) of PR1 401, PR1 DR 404 begins acting in place of PR1 401 by performing normal operations (416) thereof.

Figure 5:
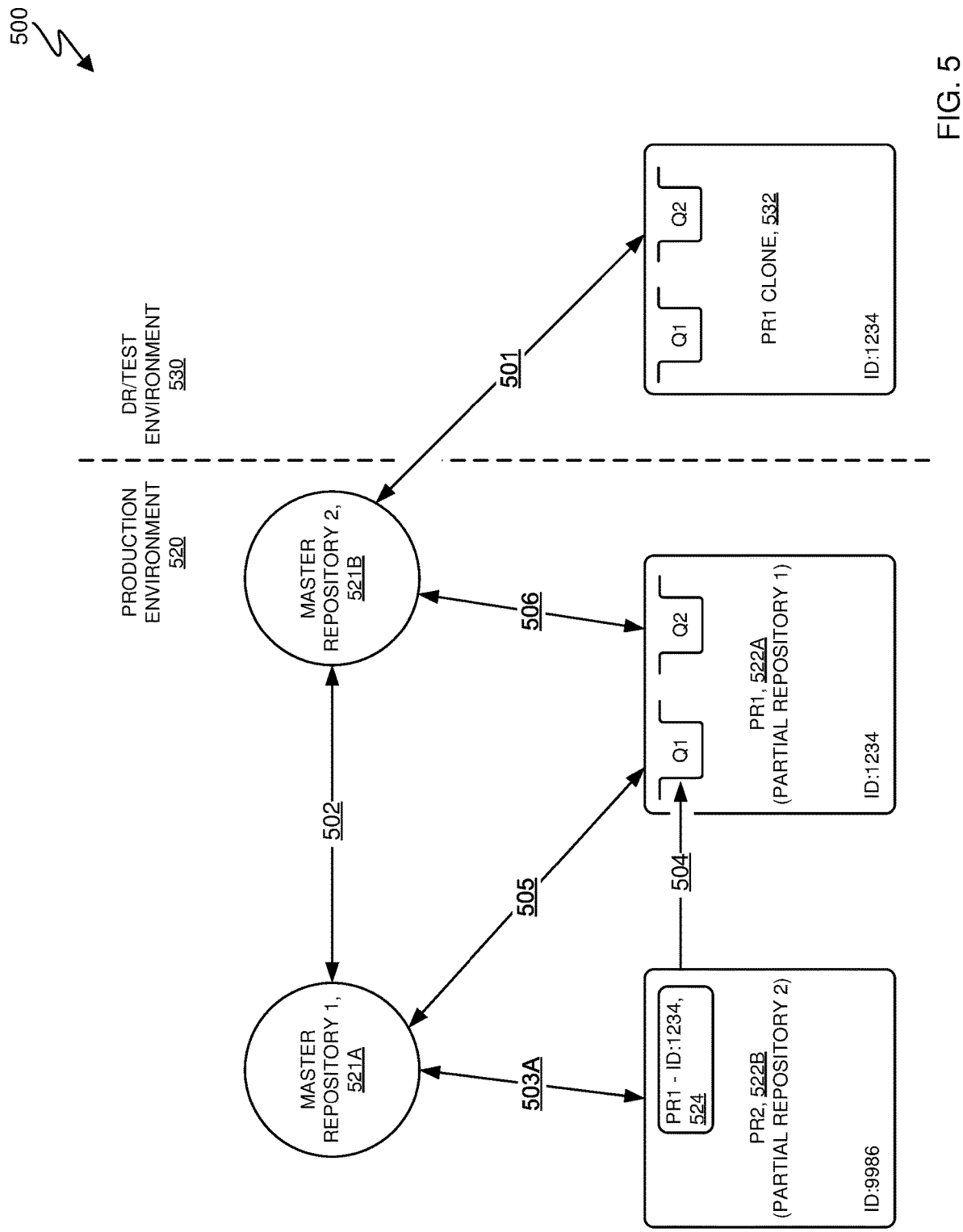
FIG. 5 is a block diagram of a third embodiment of a system according to the present invention.

Messaging environment 500, of FIG. 5, depicts parts of a messaging environment in accordance with some embodiments of the present invention. Messaging environment 500 includes: production environment 520; master repository 1 521A; master repository 2 521B; partial repository 1 (PR1 522A); partial repository 2 PR2 522B; PR1 clone 532 (a duplicate of PR1 522A); and disaster recovery/test environment (DR/test environment 530). PR1 clone 532 is established as a clone of PR1 522A at least by virtue of having the same identifier (ID: 1234). Data communication lanes among and between the repositories are represented in FIG. 5 as double-ended arrows.

In some embodiments, there are two or more master repositories in a clustering environment. A master repository (for instance master repository 1 521A) stores configuration, state and queue information about all partial repositories (for instance PR1 522A and PR2 522B) in the cluster.

A partial repository (for example PR2 522B) needs to know and remember details about the message queues that it wishes to put messages to. By way of example, if PR2 522B has to send a message to queue "Q1" of PR1 522A, PR2 522B queries master repository 1 521A, via communication path 503A, for the configuration record of queue of PR1 522A. PR2 522B receives the configuration record (524) and saves it. PR2 522B sends (504) the message to queue "Q1" of PR1 522A based on configuration record 524. Configuration record 524 includes information indicating the name ("PR1") and identifier ("1234") associated with PR1 522A.

FIG. 5 depicts only an example embodiment in a messaging cluster. In some embodiments, there may be any number of partial repositories.

DR/test environment 530 provides backup for disaster recovery in certain cases. Such cases may include, without limitation: (i) production environment 520, or repositories therein, becomes partially or fully non-functional; (ii) communication with production environment 520, or repositories therein, is interrupted or deemed too slow. DR/test environment 530 further provides an environment where system administrators and developers can test software and configuration updates, new features, bug fixes, etc., before pushing such updates out to production environment 520.

PR1 clone 532 is a messaging node in DR/test environment 530, which is outside of the production environment 520. PR1 clone 532 is a duplicate of PR1 522A of production environment 520. Master repository 1 521A and master repository 2 521B operate in conjunction to handle messaging workload directed to production environment 520. In some embodiments, PR1 522A is configured as a member of production environment 520. PR1 522A subscribes to the master repositories (master repository 1 521A and master repository 2 521B). One consequence of subscribing to the master repositories (self-subscribing) is that PR1 522A will be notified of messaging environment configuration changes about itself, and about any clones of itself operating in production environment 520.

Now, consider a case where PR1 clone 532 undergoes a configuration update. In some embodiments, a configuration update to PR1 clone 532 is triggered by an automated program flow sent to PR1 clone 532 (and any repository connected to the messaging environment), for example, in response to a configuration change of the messaging environment, or on a timed schedule. A configuration update may involve a change to an attribute of PR1 clone 532 such as a description field, a capability attribute, etc.

In response to the configuration update, PR1 clone 532 sends (501) a message about the configuration update to master repository 2 521B. Master repository 2 521B forwards (502) the configuration change to master repository 1 521A. Both master repositories subsequently pass along (503A and 503B) the configuration change to PR1 522A (the "real" PR1 instance).

In a conventional messaging environment, a partial repository (such as PR1 522A) would not receive information about itself, because it already "knows" who it is. The partial repository would receive information about changes to other repositories to which it happens to be subscribed. However when a clone of the partial repository enters into the mix, the clone may update the central repository (such as master repositories 1 and 2, respectively 521A and 521B) with any change to it's (the clone) configuration. Once the clone updates the central repository, the clone can take over and supplant the "real" repository, unintentionally, intentionally, or even with malicious intent, at least from the perspective of any interested (subscribed) parties.

In some embodiments of the present invention, however, the scenario described in the paragraph above can be detected and responded to because the "real" instance (PR1 522A) becomes (by self-subscribing) an "interested party".

Thus, PR1 522A is notified of it's own configuration changes as well as configuration change made by a clone repository (such as PR1 clone 532).

In some embodiments, the configuration of PR1 522A is considered always to be the master version. Once notified of a configuration change, whether the change originated with the "real" instance (PR1 522A) or the clone instance (PR1 clone 532), PR1 522A compares its configuration to the configuration changes passed to it by the master repositories (521A and 521B). PR1 522A reconciles the configuration changes with its own configuration (knowledge of itself). Reconciliation means that PR1 522A, determines the configuration of the entity corresponding to the configuration change, and compares that configuration with its own configuration.

In response to being notified of a configuration change to itself, PR1 522A determines whether the configuration change is legitimate or not, sometimes referred to as reconciling the configuration change with its own configuration. Once PR1 522A has reconciled the configuration change, based on the outcome, it sends a positive or negative acknowledgement to master repositories 1 and/or 2 (respectively 521A and/or 521B). The positive or negative acknowledgement may be referred to as "+ve" or "−ve".

A positive acknowledgement (+ve) means that the configuration change received by PR1 522A was expected, and/or in fact may have been initiated by PR1 522A itself (or by master repository 1 and/or 2, respectively 521A and/or 521B), and is therefore legitimate. If the acknowledgement is positive, then the master repository(ies) may forward the update to other entities subscribed to PR1 522A, such as PR2 522B.

In some embodiments, PR1 522A determines that there is a configuration problem. For instance, PR1 522A may find that its own configuration exactly matches the configuration of PR1 clone 532. This could indicate that PR1 clone 532 has become operational in production environment 520, in direct conflict with the "real" PR1 522A. In response, PR1 522A sends (503A and 503B) a negative acknowledgement (−ve) to master repositories 1 and 2 (respectively 521A and 521B), indicating that PR1 552A did not expect the configuration change and/or does not accept it. On receiving the negative acknowledgement, master repositories 1 and/or 2 (respectively 521A and/or 521B) may respond with various actions, including the following actions: (i) suspending all other subscriptions from other members; (ii) informing subscribers that there is a configuration issue; and/or (iii) remove PR1 552A from the configuration.

In some embodiments of the present invention, if master repository 1 521A, for example, receives a negative response, master repository 1 521A rejects the update and writes error messages, etc., or takes action(s) to resolve the invalid state. Potential actions include: automatically suspending subscriptions, or suspending operations involving PR1 522A until an administrator can take steps to correct the invalid state. PR1 522A and PR1 clone 532 may not know which is to be the valid repository. For example, in some embodiments, the present state (where both PR1 522A and PR1 clone 532 both exist in production environment 520) is an interim state that is intended to exist temporarily, such as may occur while maintenance was being applied and the PR1 522A was being taken offline.

In some embodiments of the present invention, the mere fact that PR1 522A (the real instance) hears about "itself" (in fact, another instance of itself for which it did not trigger an update) and in response, determines that there must be a clone (as opposed to a secondary instance of itself).

In some embodiments, master repository 1 521A and Master repository 2 521B communicate between themselves state changes involving partial repositories PR1 522A and PR2 522B.

In some embodiments, partial repositories PR1 522A and PR2 522B communicate among and between themselves and master repositories 1 and 2 (respectively 521A and 521B) via communication paths as follows:

PR1 522A communicates with master repositories MR1 521A and MR2 521B via paths 505 and 506 respectively.

PR2 522B sends a message destined for Q1 (a message queue hosted by PR1 522A) via path 504. (Q1 and Q2 are message queues hosted on PR1 522A)

A master repository is one (of usually two in a typical clustering environment, but may be more) which stores configuration, state and queue information about all of the partial repositories in the cluster.

A partial repository would only need to know and remember details about the message queues that it wishes to put messages to.

This is only an example cluster, in a typical messaging cluster, there could be many more partial repositories.

In some embodiments of the present invention, a system with central configuration management detects incorrect configuration changes. A runtime process self-subscribes to a master repository. The self-subscription causes the runtime process to receive notification when updates originating from itself (for example, updates to the runtime process configuration) are made. Upon receiving notification of a configuration update, the runtime process determines whether the configuration update originates from the runtime itself or from a cloned version of the runtime process. Self-subscription, at least in the domain of enterprise messaging systems, thereby prevents a runtime process from unintentionally joining an incorrect cluster of runtime processes (runtimes). Self-subscription further helps to prevent configuration changes of the cloned version of the runtime process from impacting other runtimes in an enterprise messaging system.

Figure 6:
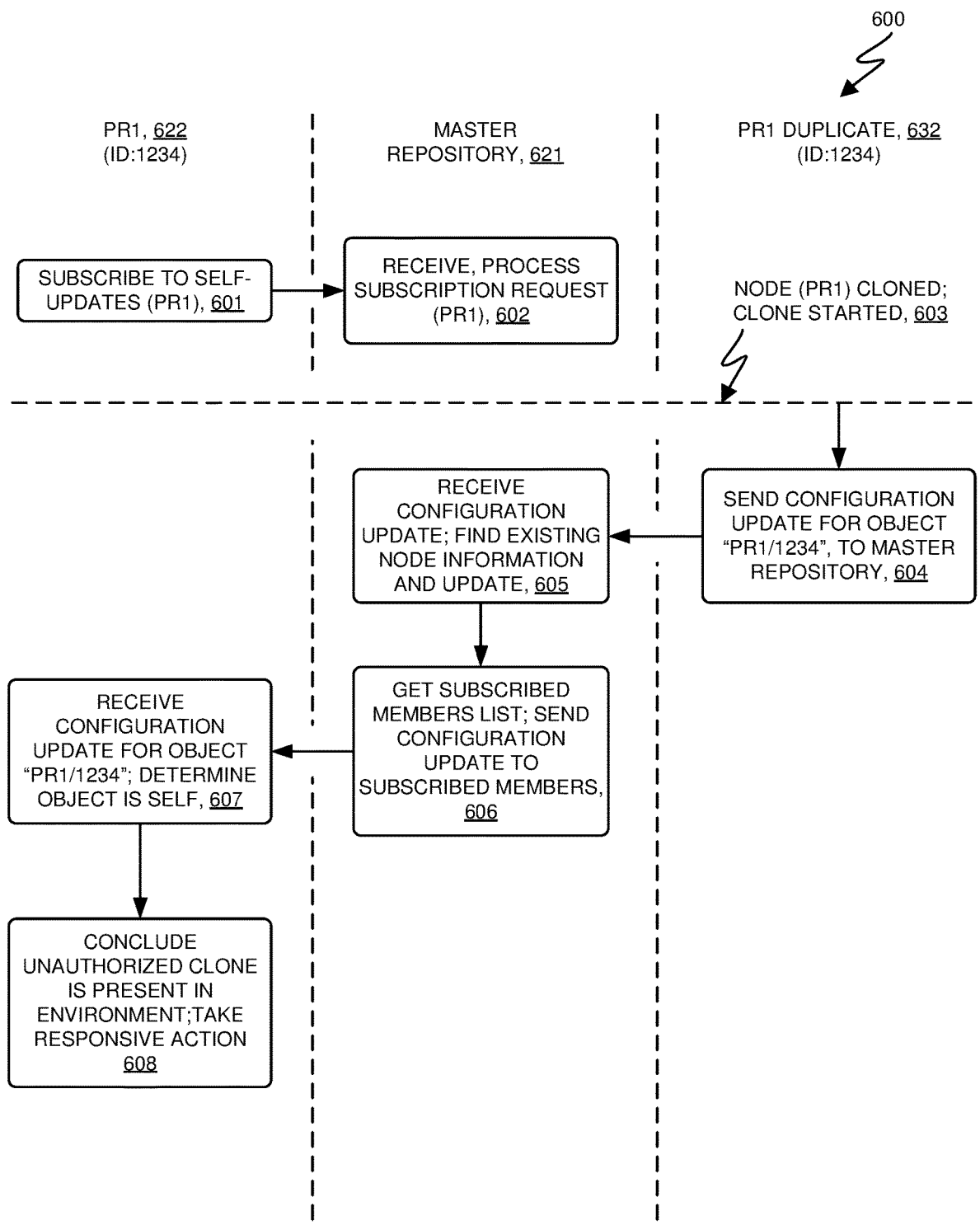
FIG. 6 is a sequence diagram showing a fourth embodiment method performed, at least in part, by a fourth embodiment system.

Sequence diagram 600 of FIG. 6 describes a sequence of operations (process flow) performed in a messaging environment, in accordance with at least one embodiment of the present invention. The messaging environment, depicted in the embodiment of sequence diagram 600 includes production environment 520 and (disaster recovery) DR/test environment 530 (see FIG. 5).

Processing begins at operation 601, where PR1 622 sends a subscription request to master repository 621. The request is for a subscription to itself (PR1 622), herein referred to as a self-subscription. PR1 622 is associated with the identifier "1234".

Processing proceeds at operation 602, where master repository 621 receives and processes the subscription request. To process the subscription request, master repository 621, at least, adds a subscription to PR1 622, for PR1 622.

At any time, before or after PR1 622's self-subscription has become effective, event 603 occurs, where PR1 duplicate 632 clones PR1 622. At least part of the cloning process entails an update to the configuration of PR1 duplicate 632, to match, at least in relevant part, the configuration of PR1 622. Consequently, PR1 duplicate 632 starts to operate in the messaging environment, appearing the same as PR1 622. At least some messaging activity directed at PR1 622 may become directed instead to PR1 duplicate 632.

PR1 duplicate 632 may begin to clone PR1 622 for any number of reasons, including for example: (i) a configuration update, intentional or otherwise; (ii) deliberate action taken by a malicious actor; (iii) operation of a malicious program; (iv) operation of a defective (buggy) program or algorithm; (iii) a disaster recovery operation in response to loss of communication with PR1 622, etc.

Processing proceeds at operation 604, where PR1 duplicate 632 sends its updated configuration (and/or other relevant node information associated with object "PR1/1234") to master repository 621.

Processing proceeds at operation 605, where master repository 621 receives the node information and in response, looks up information pertaining to the existing node (the "real" partial repository, PR1 622), because the node information just received is the same, at least in relevant part (for example, same name "PR1" and same identifier "1234"), as information for the "real" messaging node (PR1 622).

Processing proceeds at operation 606, where master repository 621 looks up a list of members subscribed to PR1 622. PR1 622 is one of the members in that list because it self-subscribed (see operation 601 discussed above). Master repository 621 proceeds to send the configuration update to the subscribed members, including PR1 622.

Processing proceeds at operation 607, where PR1 622: (i) receives the configuration update for object "PR1/1234"; (ii) recognizes that object "PR1/1234" is in fact itself (PR1 622); and (iii) determines that it (PR1 622) did not originate the configuration update.

Processing proceeds at operation 608, where in view of item (iii) in the paragraph above, PR1 622 concludes that a clone of itself exists in the messaging environment. PR1 622 further concludes that this clone is not authorized, for example because it (PR1 622) had not been informed that it will be taken offline and a clone substituted in its place. In response, PR1 622 proceeds to take responsive action (in some embodiments, referred to as "evasive" action). In some embodiments, potential responsive actions include: informing master repository 621 that an unauthorized clone (PR1 duplicate 632) is active in the messaging environment 520, whereupon master repository 621 may perform the following actions: (i) reconfigure PR1 duplicate 632 to remove it from messaging environment 520 and restore it to DR/test environment 530 (see FIG. 5); (ii) reconfiguring PR1 622 into an inactive state, thereby allowing PR1 duplicate 632 to operate in place of PR1 622; (iii) reconfiguring both PR1 622 and PR1 duplicate 632 to operate in conjunction with each other, sharing the messaging workload between them; (iv) sending a message to DR/test environment 530, directing it to reconfigure PR1 duplicate 632 such that it is brought back into DR/test environment 530 and removed from production environment 520; and/or (v) reconfiguring PR1 duplicate 632 such that PR1 duplicate 632 operates as a normal partial repository and ceases to operate as a clone of PR1 622 (or any other partial repository) in the messaging environment. There may be many more responsive actions possible that remain within the spirit and scope of the present invention.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
registering, by a first node of a computing environment, a self-subscription, with a central repository of the computing environment;
receiving, by the first node, a notification message including information with respect to a configuration modification of a second node, wherein:
 (i) the second node is configured to operate as a clone of the first node, and
 (ii) the notification message is generated based on a combination of the configuration modification and the self-subscription;
in response to receiving the notification message:
 reconciling, by one or more processors, the configuration modification of the second node with a configuration of the first node; and
 performing a responsive action automatically, based on an outcome of reconciling the configuration modification of the second node with the configuration of the first node, wherein the responsive action comprises reconfiguring at least one of the first node or the second node.

2. The method of claim 1, further comprising:
wherein the responsive action is selected from the group consisting of:
 reconfiguring the first node to assume an inactive state with respect to the computing environment;
 reconfiguring the second node to assume an inactive state with respect to the computing environment;
 reconfiguring the second node such that the second node ceases to operate as a clone of the first node in the computing environment; and
 reconfiguring both the first node and the second node whereby both the first node and the second node operate in conjunction with one another, in a workload sharing fashion, in the computing environment.

3. The method of claim 1, wherein:
the second node is a messaging node capable of taking on an identity and a role of the first node in at least a disaster recovery action; and
the second node resides in a disaster recovery and test computing environment.

4. The method of claim 1, wherein the computing environment is a messaging environment.

5. The method of claim 1, wherein the first node is a messaging node in the computing environment.

6. A computer program product comprising a computer readable storage medium, that is not a transitory signal per se, having stored thereon program instructions programmed to perform:
registering, by a first node of a computing environment, a self-subscription, with a central repository of the computing environment;
receiving, by the first node, a notification message including information with respect to a configuration modification of a second node, wherein:
 (i) the second node is configured to operate as a clone of the first node, and
 (ii) the notification message is generated based on a combination of the configuration modification and the self-subscription;
in response to receiving the notification message:
 reconciling, by one or more processors, the configuration modification of the second node with a configuration of the first node; and
 performing a responsive action automatically, based on an outcome of reconciling the configuration modification of the second node with the configuration of the first node, wherein the responsive action comprises reconfiguring at least one of the first node or the second node.

7. The computer program product of claim 6, further comprising instructions programmed to perform:
wherein the responsive action is selected from the group consisting of:
 reconfiguring the first node to assume an inactive state with respect to the computing environment;
 reconfiguring the second node to assume an inactive state with respect to the computing environment;
 reconfiguring the second node such that the second node ceases to operate as a clone of the first node in the computing environment; and
 reconfiguring both the first node and the second node whereby both the first node and the second node operate in conjunction with one another, in a workload sharing fashion, in the computing environment.

8. The computer program product of claim 6, wherein:
the second node is a messaging node capable of taking on an identity and a role of the first node (cloning the first node) in at least a disaster recovery action; and
the second node resides in a disaster recovery and test computing environment.

9. The computer program product of claim 6, wherein the computing environment is a messaging environment.

10. The computer program product of claim 6, wherein the first node is a messaging node in the computing environment.

11. A computer system comprising:
one or more processors; and
a computer readable storage medium that is not a transitory signal per se;
wherein:
 the one or more processors is able to run program instructions stored on the computer readable storage medium; and
 the program instructions include instructions programmed to perform:
  registering, by a first node of a computing environment, a self-subscription, with a central repository of the computing environment;
  receiving, by the first node, a notification message including information with respect to a configuration modification of a second node, wherein:

(i) the second node is configured to operate as a clone of the first node, and
(ii) the notification message is generated based on a combination of the configuration modification and the self-subscription;
in response to receiving the notification message:
reconciling, by one or more processors, the configuration modification of the second node with a configuration of the first node; and
performing a responsive action automatically, based on an outcome of reconciling the configuration modification of the second node with the configuration of the first node, wherein the responsive action comprises reconfiguring at least one of the first node or the second node.

12. The computer system of claim 11, further comprising instructions programmed to perform:
wherein the responsive action is selected from the group consisting of:
reconfiguring the first node to assume an inactive state with respect to the computing environment;
reconfiguring the second node to assume an inactive state with respect to the computing environment;
reconfiguring the second node such that the second node ceases to operate as a clone of the first node in the computing environment; and
reconfiguring both the first node and the second node whereby both the first node and the second node operate in conjunction with one another, in a workload sharing fashion, in the computing environment.

13. The computer system of claim 11, wherein:
the second node is a messaging node capable of taking on an identity and a role of the first node (cloning the first node) in at least a disaster recovery action; and
the second node resides in a disaster recovery and test computing environment.

14. The computer system of claim 11, wherein the computing environment is a messaging environment.

15. The computer system of claim 11, wherein the first node is a messaging node in the computing environment.

* * * * *